UNITED STATES PATENT OFFICE.

CARL OSKAR MÜLLER, OF HÖCHST-ON-THE-MAIN, AND AUGUST LUTHER, OF NIED-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

DYESTUFF.

1,041,146. Specification of Letters Patent. Patented Oct. 15, 1912.

No Drawing. Application filed November 17, 1911. Serial No. 660,893.

*To all whom it may concern:*

Be it known that we, CARL OSKAR MÜLLER, Ph. D., chemist, and AUGUST LUTHER, Ph. D., chemist, citizens of the Empires of Germany and Russia, respectively, residing at Höchst-on-the-Main and Nied-on-the-Main, Germany, respectively, have invented certain new and useful Improvements in New Dyestuffs, of which the following is a specification.

We have found that new dyestuffs of great technical value can be obtained by combining the amino derivatives of the benzylsulfonic acid with aminobenzoyl-2-amino-5-naphthol-7-sulfonic acid and then diazotizing the dyestuffs thus obtained and coupling them with β-naphthol. These new dyestuffs have the following formula:

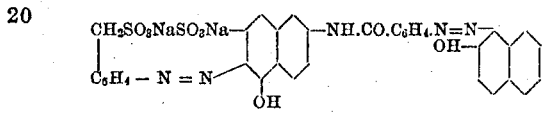

They readily dissolve in water with a red color and dye unmordanted cotton bright yellowish-red tints of excellent fastness to acids.

The following example illustrates our invention: 19 kilos of p-aminobenzylsulfonic acid are diazotized in the known manner and combined with 40 kilos of p-aminobenzoyl 2-amino-5-naphthol-7-sulfonic acid in a solution rendered alkaline with soda. The dyestuff thus obtained is salted out, filtered off and washed with a solution of common salt. It is then made into a fine magma and after being diazotized in the usual manner, it is combined with 15 kilos of β-naphthol, filtered, pressed and dried. The dyestuff thus produced has the formula:

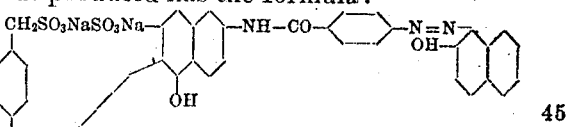

It dyes unmordanted cotton very pure and bright orange tints.

Having now particularly described our invention, what we claim is:

1. As new articles of manufacture, dyestuffs of the formula:

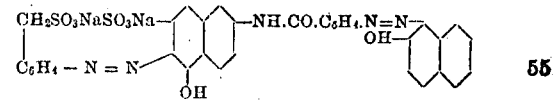

being red powders readily soluble in water with a red color, dyeing directly unmordanted cotton bright yellowish-red tints of excellent fastness to acids.

2. As a new article of manufacture, the dyestuff of the formula:

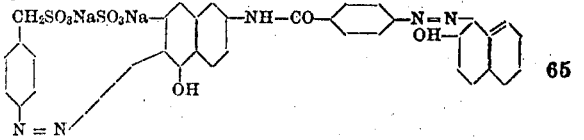

being a red powder, readily soluble in water with a red color, dyeing directly unmordanted cotton bright yellowish-red tints of excellent fastness to acids.

In testimony whereof, we affix our signatures in presence of two witnesses.

CARL OSKAR MÜLLER.
AUGUST LUTHER.

Witnesses:
 JEAN GRUND,
 CARL GRUND.